(12) United States Patent
Piety et al.

(10) Patent No.: US 12,555,250 B1
(45) Date of Patent: *Feb. 17, 2026

(54) VISUAL RENDERINGS OF MODAL ANALYSIS TEST FREQUENCIES FROM MATHEMATICALLY-MODIFIED VIDEO TEST RECORDINGS

(71) Applicant: RDI TECHNOLOGIES, INC., Knoxville, TN (US)

(72) Inventors: Kenneth Ralph Piety, Knoxville, TN (US); Jeffrey R. Hay, Prospect, KY (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,826

(22) Filed: Aug. 3, 2023

Related U.S. Application Data (63) Continuation-in-part of application No. 18/129,935, filed on Apr. 3, 2023, now abandoned, which is a continuation of application No. 17/882,118, filed on Aug. 5, 2022, now Pat. No. 11,631,185.

(60) Provisional application No. 63/232,765, filed on Aug. 13, 2021.

(51) Int. Cl.
*G06T 7/246* (2017.01)
*G01M 7/02* (2006.01)
*H04N 5/77* (2006.01)

(52) U.S. Cl.
CPC ............ *G06T 7/248* (2017.01); *G01M 7/025* (2013.01); *H04N 5/77* (2013.01); *G06T 2207/10016* (2013.01)

(58) Field of Classification Search
None
See application file for complete search history.

(56) References Cited

U.S. PATENT DOCUMENTS

| 8,705,047 B2 | 4/2014 | Jiang et al. | |
| 10,977,800 B1 * | 4/2021 | Hay | G06T 3/4053 |
| 2005/0114045 A1 * | 5/2005 | Giurgiutiu | G01N 29/4445 702/35 |
| 2016/0144404 A1 | 5/2016 | Houston et al. | |
| 2016/0300341 A1 * | 10/2016 | Hay | G06T 7/13 |
| 2022/0182014 A1 * | 6/2022 | Olayiwola | H02S 50/10 |

* cited by examiner

*Primary Examiner* — Heather R Jones
(74) *Attorney, Agent, or Firm* — Wyatt, Tarrant & Combs, LLP; Stephen C. Hall (57) ABSTRACT

A method for non-contact modal analysis uses an optical sensing device such as a video camera. Unlike traditional modal analysis, requiring accelerometers or force sensors to measure the modal characteristics of a structure and animate the motion of a wireframe model of the test structure, the inventive system mathematically modifies the original video recordings by filtering, amplifying, and modifying the playback rate or applying modal shape mask or vectors to produce modified video to show motion at each modal frequency. This provides animated mode shapes with higher spatial and temporal resolution that possible with the traditional approach of using wireframe model animations.

8 Claims, 10 Drawing Sheets

VISUAL RENDERINGS OF MODAL ANALYSIS TEST FREQUENCIES FROM MATHEMATICALLY-MODIFIED VIDEO TEST RECORDINGS

CROSS REFERENCE TO RELATED APPLICATIONS

This is a continuation-in-part patent application of, and claims partial benefit of and priority to, U.S. Nonprovisional Utility application Ser. No. 18/129,935, filed Apr. 3, 2023, which was a continuation application of and claimed benefit of priority to U.S. Nonprovisional Utility application Ser. No. 17/882,118 filed Aug. 5, 2022 and issued as U.S. Pat. No. 11,631,185 on Apr. 18, 2023, which claimed benefit of and priority to U.S. Provisional Application No. 63/232,765, which was filed Aug. 13, 2021, the contents of all of which are incorporated herein by reference.

FIELD OF INVENTION

Multiple embodiments described and provided for herein pertain to systems, apparatuses, and methods for performing a modal test of machinery, machine components, and inanimate physical structures where the input signals, if available, are measured by an independent data acquisition system synchronized with the response motion captured in video recordings; and the modal frequencies and mode shapes are presented visually by mathematically modifying an original video recording of the system or structure rather than a model of the system or structure under test.

BACKGROUND

Traditional modal analysis begins by establishing a model of the structure or components to be tested; herein referred to as the device-under-test ("DUT" and sometimes referred to herein synonymously as the "structure"). The model is constructed as a wireframe representation of the DUT and is used to identify the individual locations where measurements will be made. In traditional modal analysis, the frequency response function (FRF) can be estimated from exciting the structure with an input signal such as an impact hammer or shaker exciter and measuring the response at various locations on the structure. Traditional modal analysis techniques require simultaneous data acquisition of both the input stimulus and the output response to compute the modal characterization of the DUT. This is typically performed with a multichannel data acquisition system (DAQ) utilizing a synchronized analog to digital converter (ADC) for each channel. The input signal would typically be the voltage from a force sensor integrated in an impact hammer or mounted at the end of the stinger probe from a shaker exciter. The output signal(s) in response would be a voltage from one or more sensors that measure either displacement (eddy current probe), velocity (velometer), or acceleration (accelerometer). For traditional modal analysis, it is essential that the causality of the input to output measurement is preserved, meaning that the time-varying response measured at the output can be aligned with the time-varying input signal on the same time axis.

The inventive system described herein uses an optical sensor in the place of a displacement or acceleration sensor to measure the response of the structure. To achieve usable modal analysis results, it is essential to ensure that the phase of the excitation signal with respect to the measured response is preserved. In a traditional modal analysis system, this would be accomplished using a synchronized multichannel DAQ. A synchronized DAQ would ensure that all channels are sampled simultaneously so that the respective phase information is preserved. However, this approach is no longer possible when the response motion of the structure is measured with a camera. The disparate sources of the input signal and the video stream from the camera must be synchronized to perform a valid modal test. The modal frequencies of the structure and the mode shapes are mathematically extracted from the measured FRFs, and traditional modal analysis systems present animated motion of the wireframe model of the structure at the various modal frequencies. Accordingly, the true motion of the structure can only be determined at locations where the FRFs have been measured. Any other locations on the model would be shown with an interpolated motion based on true motion measured at surrounding measurement locations. The spatial representation of the motion of the model is limited by the number of response measurements that are made during the testing process.

SUMMARY

In some embodiments for performing modal tests in accordance with the present embodiments, input signals are measured using a traditional DAQ suitable for vibration analysis ($\leq 200$ kHz sample rate). Without limiting the range of DAQ's that can be employed with present embodiments, some DAQ's are capable of analyzing vibration frequencies up to 80 kHz. At the same time, response motion of the structure captured in video recordings can be measured using a high-speed, high-resolution camera. Using image processing techniques, the motion of specific features (points, edges, and objects) at multiple spatial locations can be tracked frame to frame to create an output displacement measurement for each feature. Each displacement measurement is analogous to an output sensor in a traditional modal analysis scenario. Since the input and output signals are measured by two disparate data acquisition systems, a synchronization clock must be incorporated into both systems to properly interpret the data collected from the DUT. Thus, systems according to this application may execute machine-readable program instructions (i.e., a computer program) to perform digital signal processing techniques to ensure a camera frame time basis congruent with the DAQ time basis to facilitate the calculation of traditional input-to-output algorithms used in modal analysis. This inventive approach was described in U.S. Pat. No. 11,631,185. The optical measurement of the response motion could be applied to a wireframe model of the structure under test just as done in traditional modal analysis. However, an alternative method for visualizing the motion at modal frequencies is described herein that avoids the need for creating a model of the structure and provides a visualization of the mode shapes with a much higher spatial resolution using the original video data. This resolution is several orders of magnitude higher than what can be practically obtained using the traditional sensors at discrete locations on a wireframe of the structure. Additionally, the time required to collect the test data is dramatically reduced using video recording devices.

BRIEF DESCRIPTION OF DRAWINGS

The drawings and embodiments described herein are illustrative of multiple alternative structures, aspects, and features of the present embodiments, and they are not to be understood as limiting the scope of present embodiments. It will be further understood that the drawing figures described and provided herein are not to scale, and that the embodiments are not limited to the precise arrangements and instrumentalities shown.

MULTIPLE EMBODIMENTS AND ALTERNATIVES

Multiple embodiments and alternatives described and provided for herein are directed to performing modal testing on a structure (or machine, or object) using a video recording(s) of the structure, acquired with one or more video acquisition devices, such as but not limited to one or more video cameras, webcams, or digital cameras integral in cell phones (for brevity, a "camera" as used herein encompasses all such video acquisition devices). Input forces and the acceleration resulting from an excitation source results in excitation events captured and optionally measured by a data acquisition system (DAQ) that produces and records a first signal. In turn, a response exhibited by the structure is acquired by at least one video acquisition device positioned relative to the structure. The visualization of the motion at selected modal frequencies is accomplished without constructing an animating a wireframe model of the DUT.

Alternate embodiments for modal testing could employ more than one camera. Additional cameras can be synched to the first camera by running a cable between the Sync Pin connectors on the cameras. Each time the master camera acquires a video frame, the other cameras will collect a frame at the same time. The same process used to synchronize the data collected on the first camera will be applied to the output from the other cameras. Using this method, video data can be acquired from different spatial locations simultaneously which is beneficial in case one of the cameras has a perspective which can see portions of the DUT which are not viewable to the other cameras. The measurement of the motion from alternate perspectives could also be done sequentially reducing the need for additional cameras; however it would require a repetition of the entire test sequence and lengthen the time required for data collection.

Modal testing is frequently addressed to applications where the input force applied to the DUT can be measured. In this case, the FRFs used to calculate the modal parameters are based on cross signal calculations of the response signals versus this measured input signal. In some applications, however, an adequate input signal cannot be generated or measured due to the size of the structure or competing background input forces. In this case, termed operational modal testing, no input force is applied to the DUT, and the vibratory motion results from non-measured forces present in the surrounding environment. To obtain FRFs, a reference location on the structure is established and serves as the input signal. In this case, the vibratory motion at the reference location is often measured with a triaxial accelerometer. Other sensors, such as displacement sensors, laser vibrometers, or others could be used but are often less convenient. The input signal can also be selected as one of the locations identified and measured from the video recordings. If any other sensor is used other than another video camera, then the same problem of synchronizing the signals measured from the DAQ with the camera frames is very similar to synchronizing with the input force signal as described in U.S. Pat. No. 11,631,185.

Whereas U.S. Pat. No. 11,631,185 is directed to synchronizing signals from disparate data acquisition systems, at least one of which is a video acquisition device, present embodiments are directed to producing modified video that show the motion at each modal frequency. The current application addresses enhanced visualization via such modified video, not synchronization of multiple inputs in U.S. Pat. No. 11,631,185. Recognizing this, the contents of U.S. Pat. No. 11,631,185 have been and are fully incorporated by reference herein.

Figure 1A:
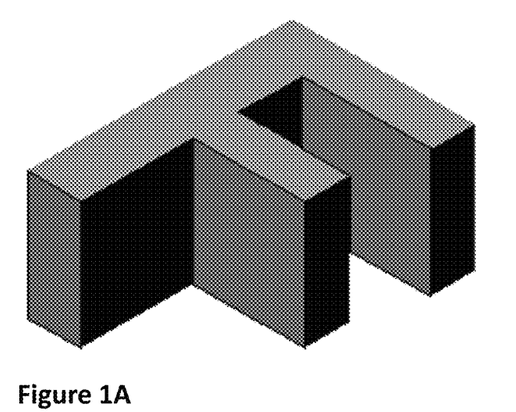
FIG. 1A is an image of an example structure which can be tested to determine its modal frequencies and mode shapes, in accordance with present embodiments.
Figure 1B:
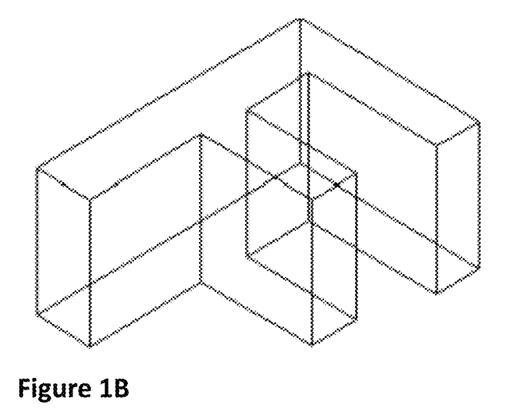
FIG. 1B is a wireframe model, according to traditional modal analysis, of the structure shown in FIG. 1A, whose motion can be assessed and animated at the different modal frequencies identified from the modal analysis test measurements.
Figure 1C:
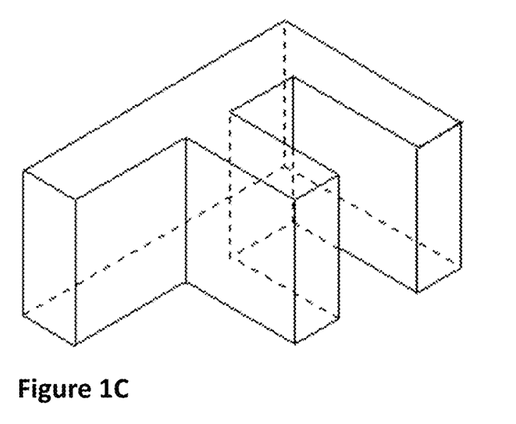
FIG. 1C uses dotted lines to show the hidden lines that are not visible from the perspective presented of the test structure shown in FIG. 1A.

Traditional modal analysis is based on measurements taken at specific locations identified on a wireframe model of the structure under test and produces animations of the wireframe model at the various modal frequencies. FIG. 1A illustrates an example of a simple structure that might be subjected to modal testing. A wireframe model that could be constructed for this structure in accordance with traditional modal analysis is shown in FIG. 1B. Commercial modal analysis software can rotate or reposition the model in three-dimensional space to see the mode shapes from the perspective of any viewer. Even hidden lines that represent surfaces that could not be seen through the solid structure are often represented as dotted lines, such as illustrated in FIG. 1C, and can be viewed in combination with the lines on the surfaces visible from the selected perspective. The ability to show the motion of hidden lines requires that simultaneous data has been collected from sensors mounted with compatible axis orientations at locations on the dotted lines. Due to access limitations, however, measurements on some surfaces of the model may be difficult or impossible.

Figure 2:
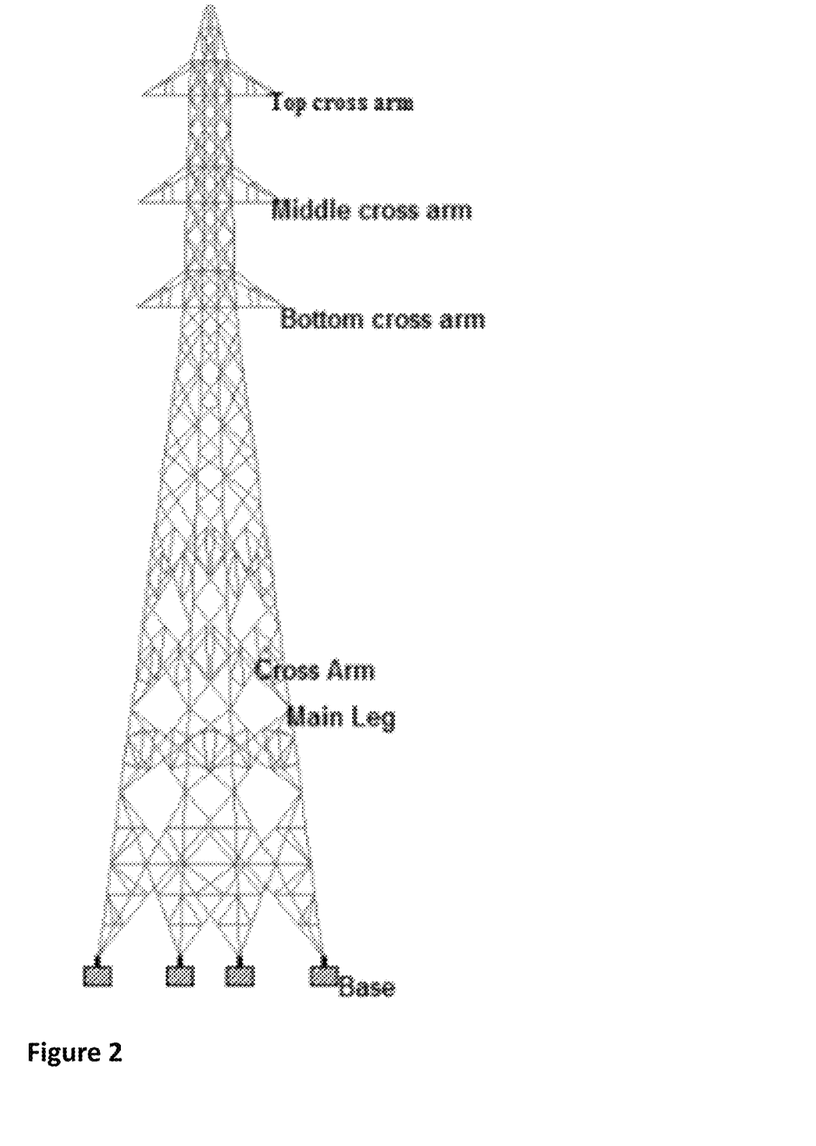
FIG. 2 is a diagram of an electrical transmission tower that illustrates the potential complexity of structures where modal testing is performed.

For example, FIG. 2 is a diagram of an electric transmission tower and illustrates the complexity of the structure. Clearly, collecting one or more measurements on each element of such a structure using accelerometers, the traditional sensor of choice, would be a very challenging task. One drawback that often arises when animating the motion of models is that the spatial resolution of the mode shape is limited to the spacing of measurement points locations on the model. The motion at all other locations is at best an interpolated value. In order to obtain the most accurate visualization of the mode shapes, the user would need to create a very detailed model and collect data from many locations with very close spatial resolution. However, this approach makes the test setup and data collection very time consuming and greatly increases the amount of data that must be processed.

Figure 3:
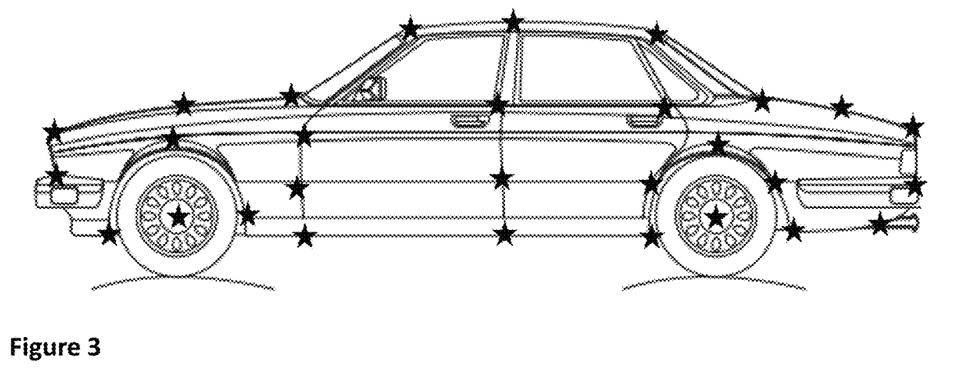
FIG. 3 displays a wireframe representation of an automobile with stars marking 29 possible measurement locations where data would be collected during traditional modal testing.
Figure 4A:
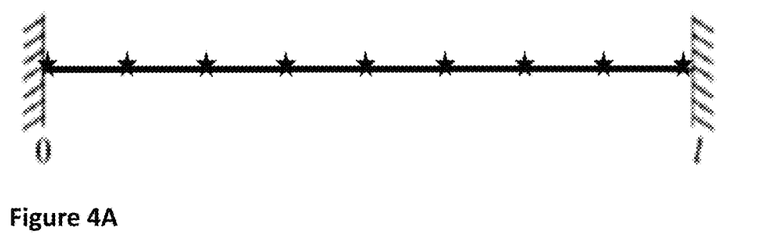
FIG. 4A is a representation of traditional modal test model that uses stars to mark nine possible measurement locations on a wireframe representation of a beam of length 1, that is constrained at both end locations.
Figure 4B:
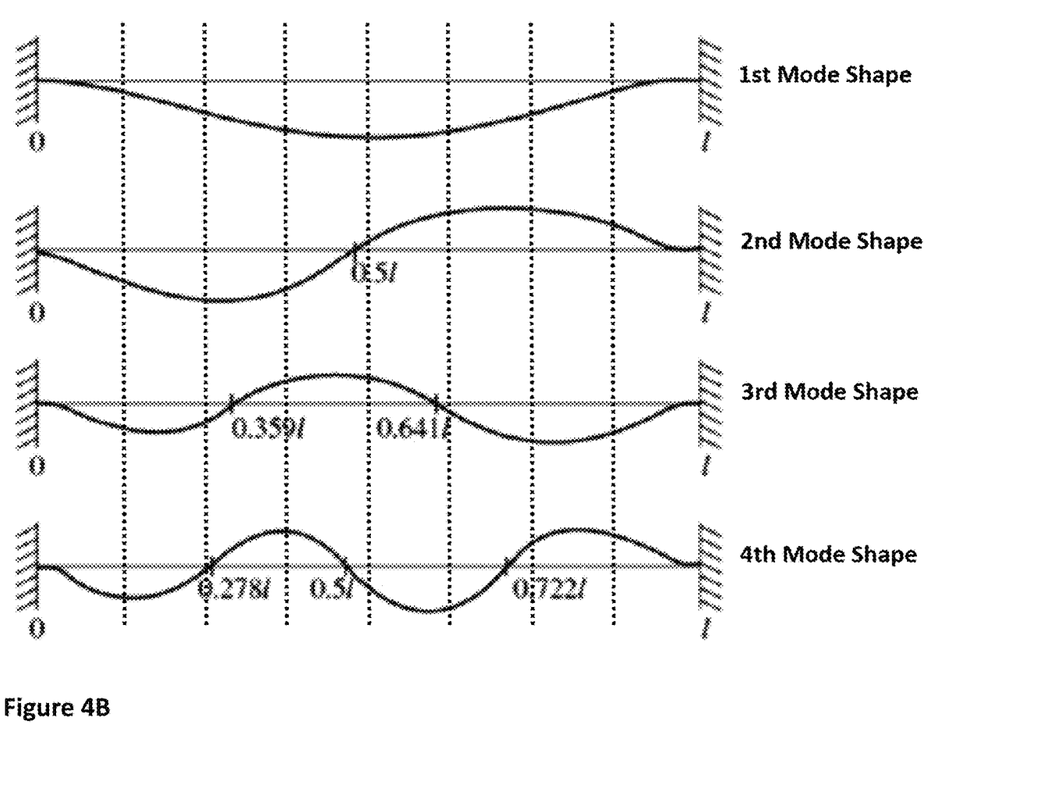
FIG. 4B shows the mode shapes of the first four modes of the beam illustrated in FIG. 4A.

FIG. 3 shows a wireframe model of an automobile with stars marking the 29 locations where measurements will be collected. These locations would provide a very coarse representation of the mode shapes of the elements comprising the car. It is readily apparent that four times as many measurement locations would be needed to get satisfactory spatial resolution and even more to characterize the motion at some of the elements present on this structure such as a mirror or a fender. FIG. 4A is a model of a very simple structure representing a solid beam fixed at its two ends. It is clear that even the 9 measurement locations, marked by stars, on such a simple structure provide questionable spatial resolution as you begin to look at the higher modes that exhibit more complex shapes as shown in FIG. 4B.

In accordance with embodiments described herein, there is no need to construct a wireframe model of the structure being tested. The mode shapes and their motion for the calculated modal frequencies is accomplished by mathematically modifying the video data resulting in the ability to visualize the true motion of the structure with extremely high spatial resolution.

The Fundamental Law of Modal Analysis states that "All vibration is a summation of mode shapes." Thus once the modal frequencies are determined, the video recording can be filtered at that frequency and enhanced mathematically to exhibit the motion of the structure at that modal frequency. The amount of amplification and playback speed may be adjusted by the user to provide the best visualization of the motion. The filtering of the video at the modal frequency removes the contribution of the motion from all other modes and provides a visualization with the same spatial resolution as the original video. An exemplary method of filtering based on using reconstructed time waveforms as described in U.S. Pat. No. 11,322,182 can be used to construct a video with higher temporal resolution than the sampling rate of the original video recording and can modify the length of the video to be an exact number of cycles of the modal frequency so that looping the video does not create any visual discontinuities at the loop transition. Thus, inventive methods and systems in accordance with the present embodiments enable modal testing to be performed without requiring the creation of a wireframe model. Such inventive methods and systems produce an animated mode shape of the actual image of the structure under test with much higher spatial and temporal resolution than is possible by traditional modal analysis systems, and obtaining measurements according to such inventive methods and systems takes a fraction of the time required to achieve this result compared to traditional modal testing.

A disadvantage to the visualization of modal shapes described herein is the inability to show any motion not visible in the field of view (FoV) of the camera. Thus, this technique could never render the motion of hidden surfaces. This drawback can be addressed to some degree by taking video recordings simultaneously from different perspectives or by making sequential measurements from a different perspective. If surfaces of the structure need to be analyzed that are not visible from any camera position, then this technique is not suitable. This same problem arises with traditional measurements if a sensor cannot be attached to a surface of the structure due to limited physical access.

As discussed in the Background section, traditional modal analysis methods require that an accurate geometric wireframe model be defined at the start of the project. The model is constructed using software by connecting points, trace lines, surfaces, or other geometric elements where some of the points on the wireframe model are selected as the locations to make response measurements—also called DOFs (Degrees of Freedom). DOFs define the node point location and direction/axis to measure. The geometric models help testing personnel select the best set of DOFs to measure, overview and guide the measurement process, and visualize the determined mode shape deflections of the test structure. There are some software packages that will construct models from photographs of the actual structure that helps reduce the effort in creating models. In most cases, unless a model already exists, this is a time-consuming process. The number of DOFs selected will be a compromise between the needed spatial resolution of the measurements and the added time required to collect a large number of measurements with a limited number of data acquisition channels that relies on the engineering judgment of the persons performing the test. Typically, the response motion in a modal test is measured by one or more sensors, most commonly accelerometers, which are attached to the structure. In most cases, the response sensors must be moved to cover all locations where data is to be collected. A typical modal test may require making measurements in excess of 50 spatial locations and data collection can be time consuming and possibly hazardous.

By comparison, use of a camera(s) provides a noncontact measurement and thus does not introduce mass loading effects that might compromise the motion measured. Secondly, the camera can measure the data from numerous spatial locations simultaneously. When measuring the response motion of the structure using a high-speed, high-resolution camera, the data at all locations can be measured in a matter of seconds. The motion of specific features (points, edges, and objects) at multiple spatial locations can be tracked frame to frame using a variety of optical flow techniques, familiar to those skilled in the art such as correlation-based, block-matching, feature tracking, energy-based, and gradient-based, to create an output displacement measurement for each feature. Each displacement measurement is analogous to an output sensor in a traditional modal analysis scenario measured with a frequency range equal to half of the frame rate of the camera and can determine the motion along two axes perpendicular to the optical axis of the camera. Printed or LED targets or surface markings can be added to the structure if there are not enough natural features that can be recognized by the optical sensor. The accurate measurement of the displacement motion at a position on the DUT requires a knowledge of the distance between camera lens and the position on the structure. This distance can be determined using one of several methods. One common approach is to use a laser distance measurement device such as a Bosch Blaze™ Model GLM40. A second approach is to select a structure or target mounted to the DUT that has a line segment of known dimension. A third approach is to use a 3D camera or two calibrated cameras to determine the depth/distance of features on the DUT. In some cases, a single average value of the distance to the DUT may be adequate. Other approximate distance values might be assigned by allowing a user to superimpose distance calibration lines on the reference frame and provide distance measurements at two or three positions on the line. Interpolated distance values along the calibration lines could be assigned to nearby measurement pixels/features.

The traditional method of constructing and animating a model of the test structure can be done with video measurements. In this approach, test personnel would create regions of interest (ROIs) and match these ROIs with DOFs in the wireframe model. In this case, if data is needed in all three axes, then two calibrated cameras would be need such as described in the provisional application 63/423,937 filed by RDI Technologies on Nov. 9, 2022, entitled "Measuring Dynamic Motion in Three Axes using Multiple Cameras," and discussed further below. Depending on the structure under test, input force from an impact hammer or a shaker exciter is typically applied along one axis, it is not unusual for the modes associated with that same coordinate axis to be excited. The input force would need to be applied simultaneously or sequentially along multiple coordinate axes or in an intra-axes direction with vector components that can be resolved along the coordinate axes of interest.

As mentioned, the inventive methods and systems described herein remove the need to construct a wireframe model and use the video source to produce visualizations of the mode shape with higher spatial and temporal resolution than provided from the wireframe animations. The process is outlined in the flowchart presented in FIG. 5. As described in step 51, a user sets up an input data acquisition system, one or more synchronized cameras, and lighting to perform a modal test on a structure and acquires multiple synchronized data sets with or without a known input stimulus signal. A user selects a reference frame from the video source or the saved recordings and optionally identifies spatial regions that are to be included or excluded from the reference frame manually or using object segmentation/identification algorithms and creates a modified reference frame with reduced spatial area to be processed further in step 52. Next the user requests the system software to automatically perform smart edge detection to identify boundaries of objects or components or locates the best set of features in the spatial regions of interest in step 53. Edge detection finds boundaries of objects in image, producing smoother, thinner, and cleaner images; and possibly reducing later processing to pixels that have the most information. The goal of this step is to reduce unnecessary information in the image while preserving the structure of the image, extracting important features of an image such as corners, lines, and curves. Edge detection and identification of best features detects discontinuities in brightness and is well-known to those skilled in the practices of computer vision. The edge detection process usually includes prefiltering to remove noise, applying one of many algorithms such as Canny, Sobel, Prewitt, Roberts, Zerocross, and then sometimes is followed by edge thinning algorithms. There are also machine learning algorithms developed to do edge detection such as Holistically Nested Edge Detection (HED) among others available in open-source libraries such as OpenCV and Mathworks. The identification of edges or best features in the image identifies the locations where the motion can most accurately be measured and can be used to create a motion mask that emphasize the distinct areas in the video and make the motion more visually obvious.

Figure 6A:
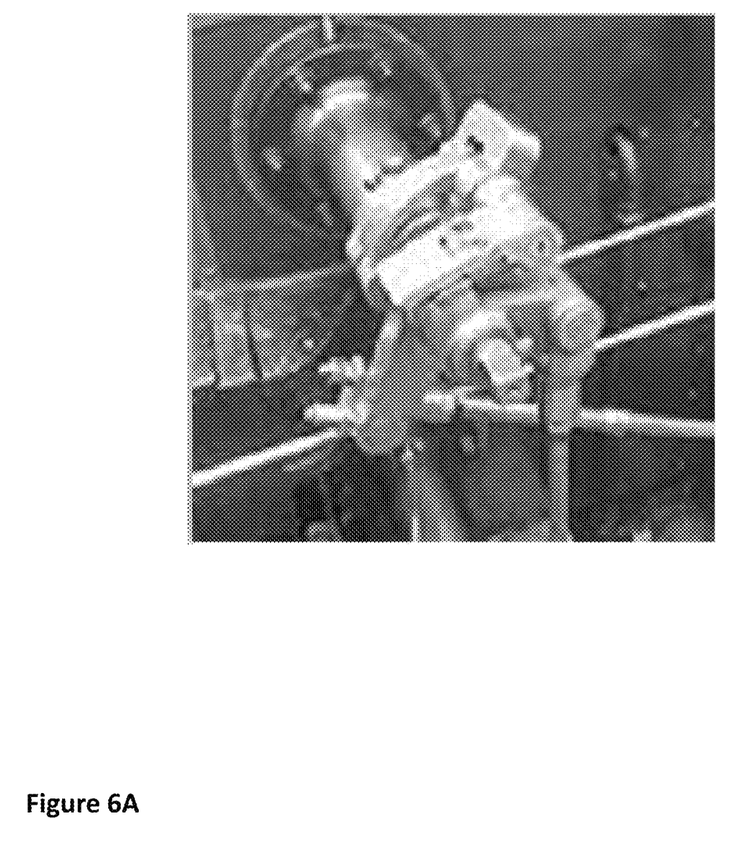
FIG. 6A shows an image of a machine component that is to be tested to determine its modal behavior.
Figure 6B:
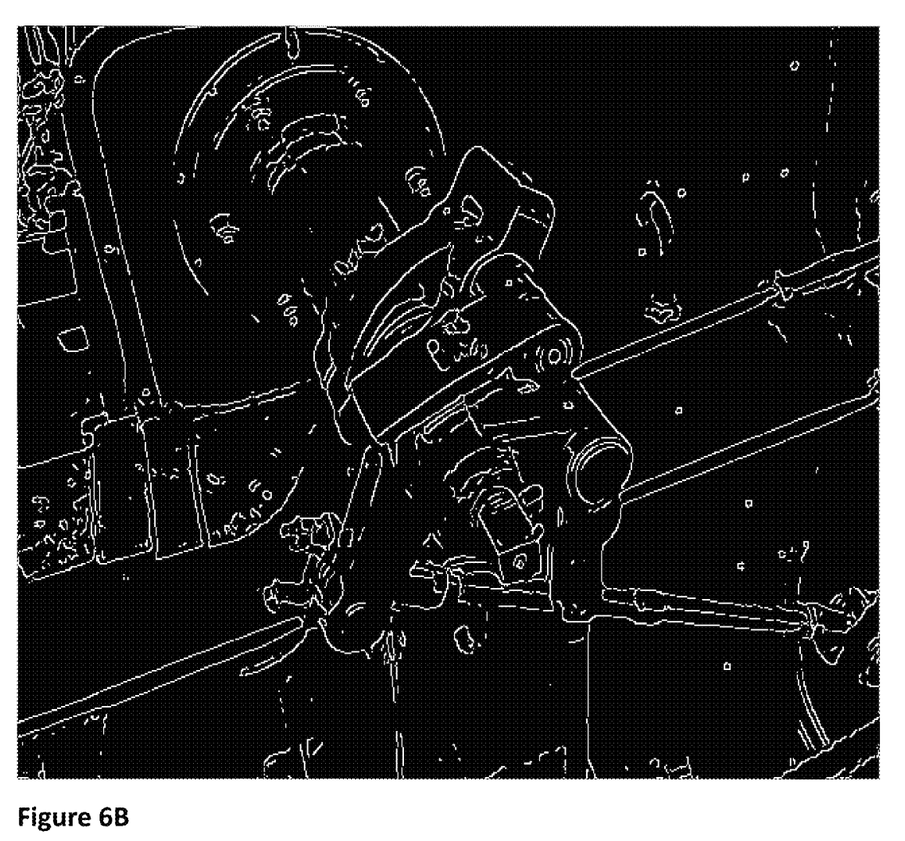
FIG. 6B shows the results of applying an edge detection algorithm to the image shown in FIG. 6A.
Figure 6C:
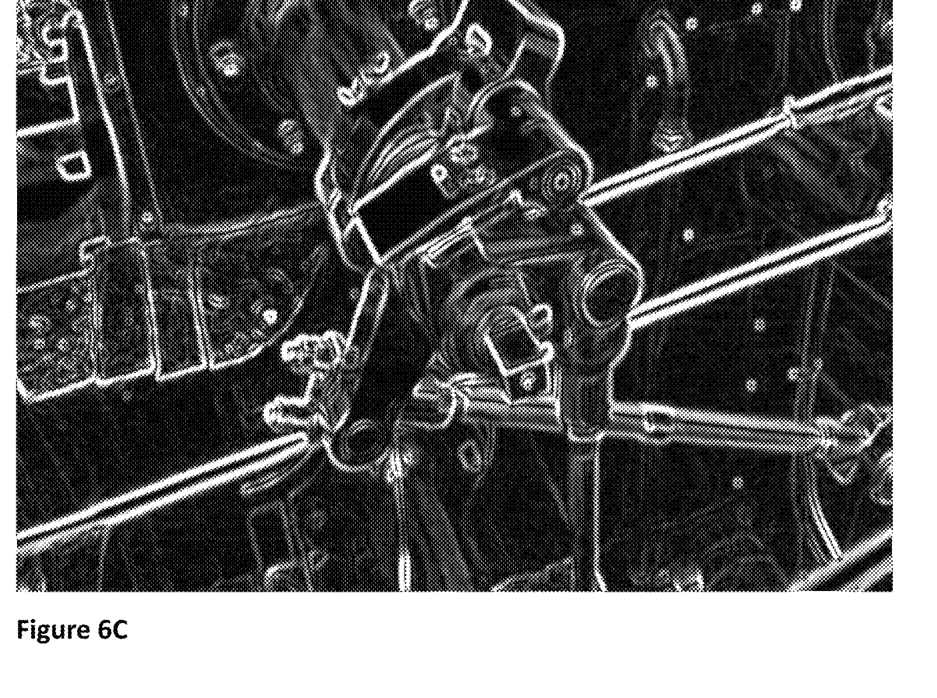
FIG. 6C shows the original image from FIG. 6A modified by superimposing enhanced white lines at the edges shown in FIG. 6B.

The user views the image of located edges/features superimposed over the modified or original reference frame and optionally adjusts a spatial resolution parameter to vary visually the subset of pixels/features where the motion will be measured and can optionally add line segments between edge pixels or features that will also be animated (54). FIGS. 6A-6C attempt to demonstrate the effects of steps 52-54 applied to a DUT. FIG. 6A shows an image of a machine component that is to be tested to determine its modal behavior. FIG. 6B shows the results of applying an edge detection algorithm to the image shown in FIG. 6A. FIG. 6C shows the original image from FIG. 6A modified by superimposing enhanced white lines at the edges shown in FIG. 6B. Steps 52-54 can occur before or after modal test data is acquired. One advantage of performing these steps before data is collected would be the opportunity to determine if supplemental targets need to be added to the structure to better visualize the motion associated with a portion of the DUT that does not have adequate contrast to define naturally occurring edges/features. A second advantage would be the opportunity to reduce the data storage requirements needed for the test by allowing the data to be processed between averages and retaining only the FRFs from processed pixels or features rather than retaining the full video recording of all averages. This would be particularly advantageous for operational modal tests that average many data sets to properly characterize the motion of the DUT since there is no well-defined input force that can be measured.

As described previously, an accurate measurement of the displacement motion at a position on the DUT requires a knowledge of the distance between camera lens and the position on the structure. This can be done using one of the methods previously described, noting that in the practice of the present embodiments, approximate distance values or even a single average distance value may be sufficient in some cases based on the relationship between the camera and the DUT and the dimensions of the DUT. The mode shape amplitudes may not be precisely proportioned at each pixel/feature being displayed, but the dynamic behavior may be adequately visualized to portray the general behavior of the mode being reviewed.

Figure 5:
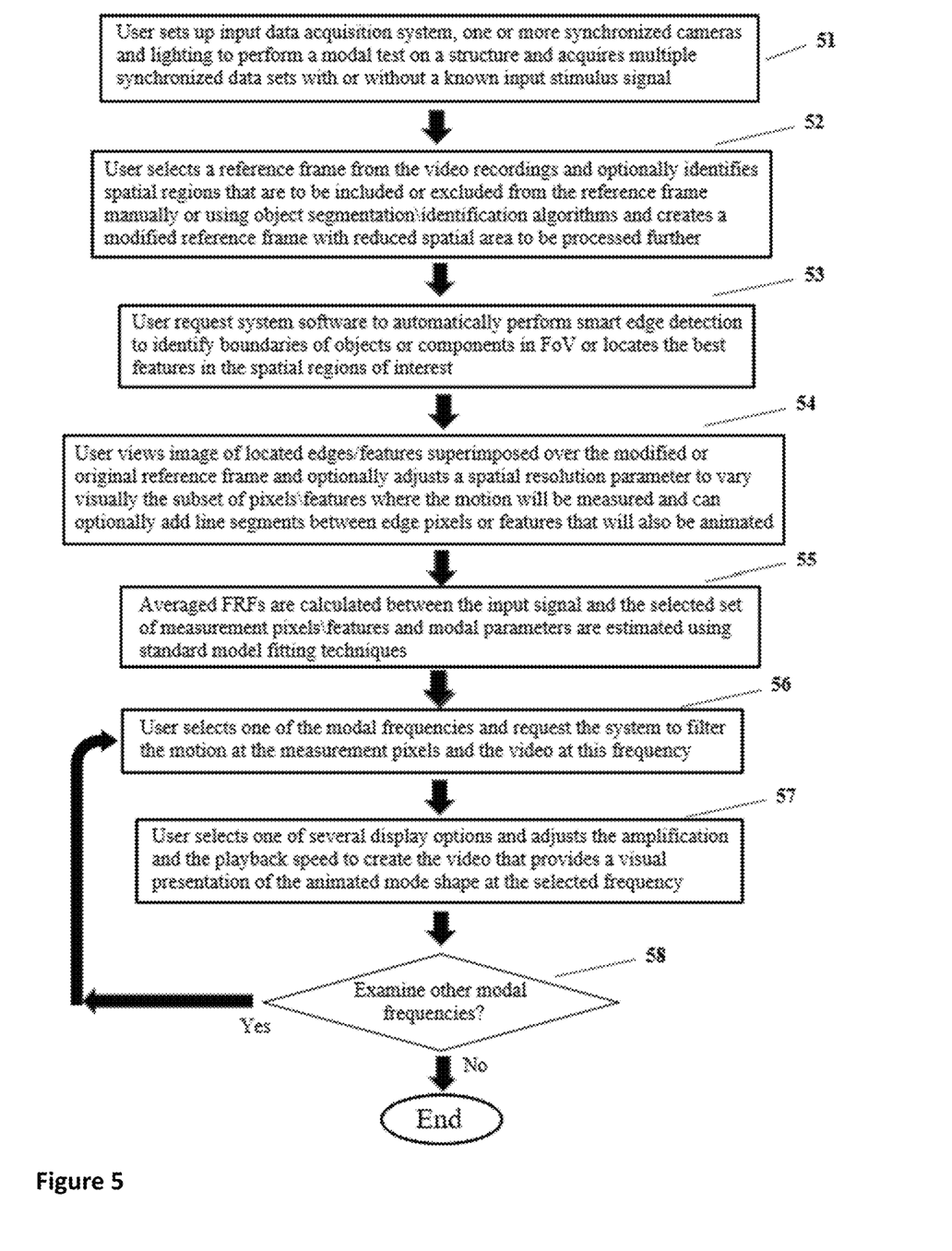
FIG. 5 is a flowchart of the methods applied to perform a modal test using video recording devices and to measure and visually display animated mode shapes without the need for constructing a wireframe model, according to multiple embodiments and alternatives.

In some embodiments, averaged FRFs are calculated between the input signal and the selected set of measurement pixels/features, and modal parameters are estimated using standard model fitting techniques (55) in accordance with FIG. 5. The user selects one of the modal frequencies and requests the system to filter the video at this frequency (56). An exemplary method of filtering based on using reconstructed time waveforms as described in U.S. Pat. No. 11,322,182 can be used to construction a video with higher temporal resolution than the sampling rate of the original video recording and can modify the length of the video to be an exact number of cycles of the modal frequency so that looping the video does not create any visual discontinuities at the loop transition. This type of filtering favorably reduces any background noise and allows larger amplification factors to be applied to the video with minimal distortion due to noise.

Figure 7:
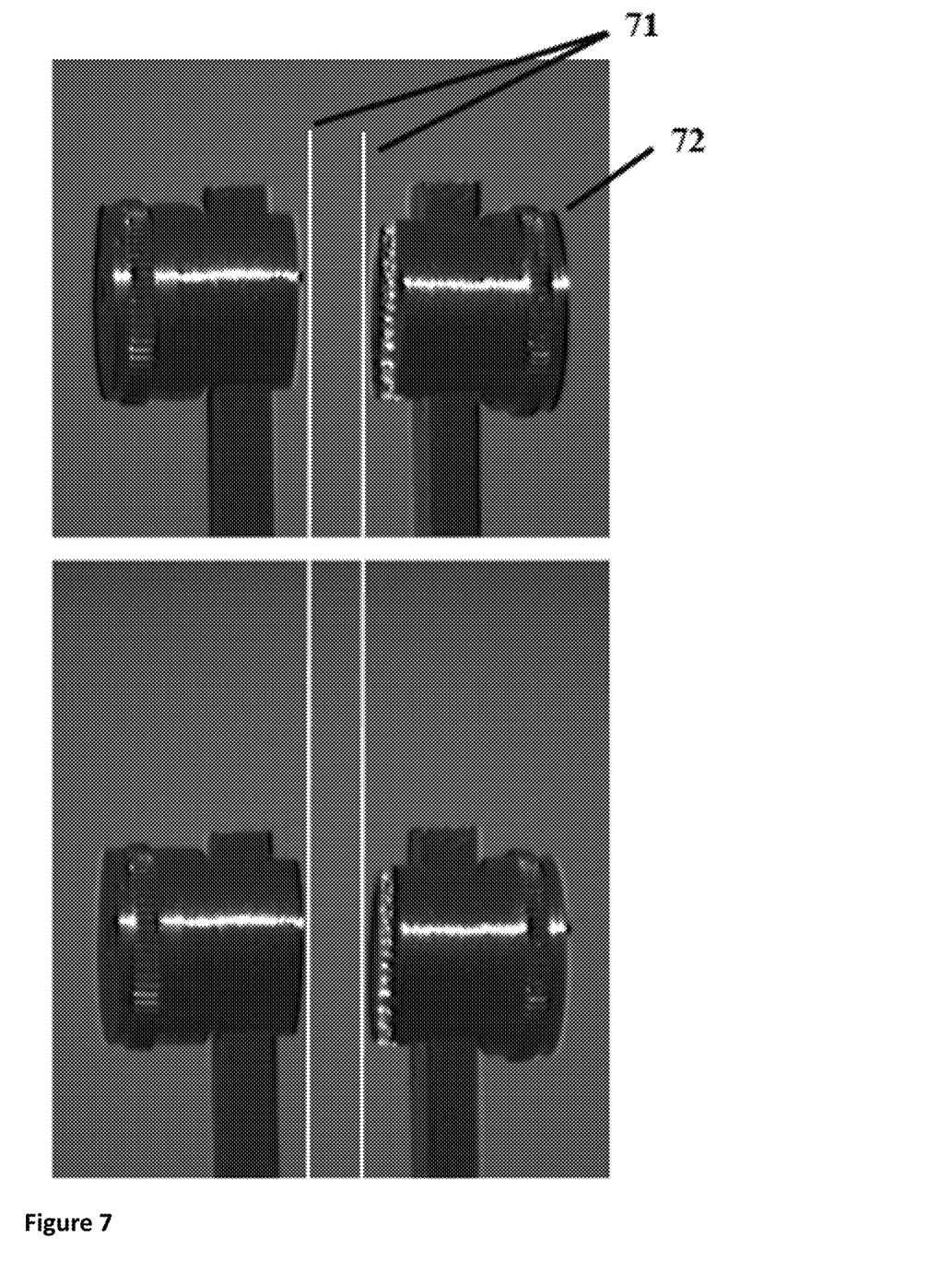
FIG. 7 shows two frames from the video of a tuning fork that has been filtered at the first mode and mathematically modified to visually show the mode shape of the forks as they move in and out.

Still with respect to FIG. 5, the system will select an initial amplification factor and the user may adjust the amplification factor applied to the filtered video and the playback speed to get a satisfactory visual presentation of animated mode shape at the selected frequency (57). Amplification is one of several methods a user may select for enhancing the visualization of the motion. In some embodiments, the filtered video amplifies the intensity of the pixels but does not move pixels spatially. This provides a presentation of the motion with extremely high spatial resolution without distorting the physical structure but limits how much the actual motion can be amplified visually. Other methods of amplification which do allow spatial distortion of the structure could be employed in other embodiments. FIG. 7 presents two frames of the amplified, filtered video of the motion of a tuning fork moving at its fundamental frequency. Two vertical white lines labelled as 71 have been superimposed on these frames to make the change in inward and outward motion more apparent.

Figure 8A:
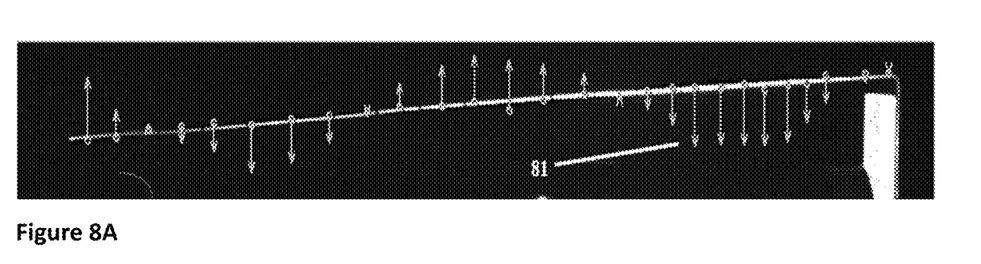
FIG. 8A is one frame from the video of the mode shape of a suspended flat beam that has been augmented with motion vectors to visibly accentuate the mode shape selected for analysis.
Figure 8B:
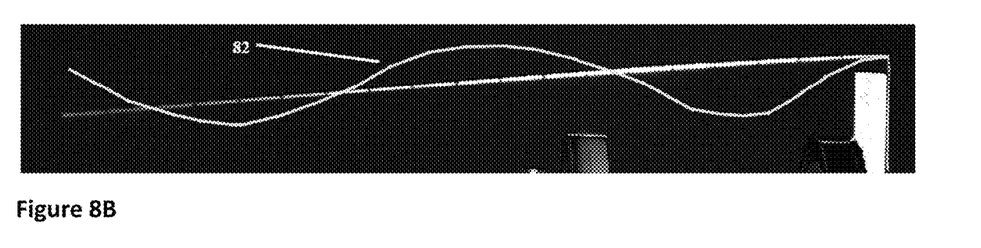
FIG. 8B is one frame from the video of the mode shape of a suspended flat beam that has been augmented by animating the motion of the line establish from an edge detection algorithm applied to the beam to visibly accentuate the mode shape selected for analysis.

Another visualization option available to the user is to apply one of several optical flow algorithms well known to those skilled in the art to determine the motion present at the each of the edge/feature pixels originally defined by the user in steps 52-54. FIGS. 8A and 8B show one frame of a video produced in analyzing the motion of a slender beam supported on one end. The motion of these pixels can be presented as motion vectors that are superimposed over the amplified, filtered video or over the reference frame as illustrated in FIG. 8A and labelled as 81. This same motion can be presented by superimposing a colored mask of the motion of the measurement pixels over the amplified, filtered video or over the reference frame as illustrated in FIG. 8B and labelled as 82. These options allow the mode shape to be independently scaled over the physical structure to create a presentation that dramatically enhances the ability to visualize the motion at the selected modal frequency. When finished viewing one modal frequency, the user can elect to examine other modal frequencies as outline in step 58 of the flowchart. Other embodiments could present this data using a variety of commonly employed graphical approaches.

The inventive methods and systems described herein enable a modal test to be performed without requiring the creation of a wireframe model. The practice of such methods and systems produces an animated mode shape of the actual image of the structure under test with much higher spatial and temporal resolution than is possible by traditional modal analysis systems and measurements, taking only a fraction of the time required to achieve this result.

Alternate embodiments for modal testing could employ more than one camera. Additional cameras can be synched to the first camera by running a cable between the Sync Pin connectors on the cameras. Each time the master camera acquires a video frame, the other cameras will collect a frame at the same time. The same process used to synchronize the data collected on the first camera will be applied to the output from the other cameras. Using this method, video data can be acquired from different spatial locations simultaneously, which is beneficial in case one of the cameras has a perspective which can see portions of the DUT, such as with hidden lines represented in FIG. 1C as an example, which are not viewable to the other camera(s).

This method described herein would only give animate modal shapes from the perspective of the camera along one or two axes. It would not be able to provide a three dimensional presentation of the mode shapes. However in many situations due to the geometry of the DUT, mode shapes along one or two axes is sufficient. When motion along all three axes is important, data must be collected from additional perspectives that reveal the missing third axis. If an appropriate perspective can be captured, this data can be collected with little additional effort. A U.S. provisional application 63/423,937 was filed by RDI Technology on Nov. 9, 2022, that defines how displacement measurements can be made along 3 coordinate axes using two calibrated cameras collecting data simultaneously. One such exemplary process described therein involves using the significant peaks in the spectra from the left and right camera to calculate z-axis motion. In such a process, a displacement of the object is calculated along two axes of the vibratory motion, representing the 2-dimensional planar series of points, and the vibratory motion of the object is determined in a third axis, which is parallel to the optical axis of one of the cameras, referred to as the reference camera. Accordingly, an exemplary process for calculating the vibratory motion in this third axis, referred to as the z-axis vibratory motion, takes advantage of the averaging inherent to the FFT algorithm and the selection of the dominant peaks in the resulting frequency spectrum to remove noise. The amplitude of the peaks in the FFT spectrum represent average RMS values determined from all of the individual time waveform values. If the spectra of the original $x_L$ and $x_R$ waveforms are calculated, then the amplitude of the peaks in the spectra are averaged values. If the sine waves represented by peaks in the frequency spectra are summed to construct new $x_L$ and $x_R$ waveforms, most of the random noise present in the original waveforms is removed. The subtraction of these waveforms will result in a z-axis waveform with greatly reduced noise and a corresponding spectrum with improved accuracy over a direct subtraction of the original waveforms. If the true peaks in the original $x_L$ and $x_R$ spectra are located, then the waveform and spectrum for the z-axis vibratory motion can be calculated using the following steps:

1. The most precise values of the amplitude, frequency, and phase for each peak should be located using the spectral windows factors method, the Goertzel algorithm, or other fitting techniques known to those skilled in the art;
2. Discard peaks that do not have a close match in frequency in the $x_L$ and $x_R$ spectra; (a) Match for same peaks in upper 20 db of spectra with better than 0.15*resolution; (b) Match for same peaks below upper 20 db of spectra with better than 0.20*resolution; (c) Ignore peaks that match lighting flicker frequency (usually 120 Hz or 100 Hz);
3. Discard low amplitude peaks whose amplitude is less than a factor of F times the noise floor; preferably using an average noise floor around each specific peak;
4. Construct the waveform and spectrum of the z-axis motion from the remaining sets of selected peaks using one of several equivalent approaches: (a) Reconstruct $x_L$ and $x_R$ waveforms by summing the sine waves from the reduced set of selected peaks; and take the difference between the $x_L$ and $x_R$ waveforms to construct the z-axis waveform and use the FFT algorithm to obtain the z-axis spectrum; (b) Construct the z-axis waveform, Z(t), using the difference in sine waves from the reduced set of selected peaks, $z_p$, defined by their amplitude, frequency, and phase values using the formulas below and then apply the FFT algorithm to get the frequency spectrum:

$Z(t)=\Sigma_{zp}(t)$ $z_p(t)=C*\sin(2\pi t+P3)$ $X1=A*\cos(P1)$ and $Y1=A*\sin(P1)$ $X2=B*\cos(P2)$ and $Y2=B*\sin(P2)$ $C=\text{Sqrt}(X1^2-2*X1*X2+X2^2)+Y1^2+2*Y1*Y2+Y2^2)$ $P3=\text{Arctan}[(X1-X2)/(Y1-Y2)]$ If we set P1 to zero, then X1=A and Y1=0 yielding $C=\text{Sqrt}(A^2-2*A*X2+X2^2+Y2^2)$ $P3=P1+\text{Arctan}[(A-X2)/Y2^2];$ and (c) The z-axis spectrum could be formed first using the values determined from the equations above and the waveform calculated using the inverse FFT algorithm.

Additionally, utilizing two cameras calibrated to allow 3-axes measurements could also be used to improve the accuracy of the measured motions in scenes where the objects in the FoV vary in their distance from the camera. The use of a 3D camera or two calibrated cameras could automatically identify the distance to each edge pixel whose motion is being processed to establish more accurate displacement measurements. The motion measured along all three axes could reduce the number of perspectives from which data might need to be collected and does emulate the measurements provided by triaxial accelerometers. However, in many applications, only the motion along one or two axes is of interest, and for such applications the present embodiments may be used.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or conducted in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method of performing modal testing on a structure using video recordings of the structure wherein the video recordings comprise a plurality of image frames, wherein each image frame is divided into a plurality of pixels, the method comprising:
   generating a plurality of excitation events, wherein individually each excitation event produces movement in the structure and collectively the excitation events produce movement at a plurality of spatial locations on the structure;
   measuring an impact on the structure produced by each of the excitation events; converting each measured excitation event to an input signal;
   obtaining the video recordings with a plurality of video acquisition devices, wherein the image frames provide output signals representing movement produced in the structure by the excitation events at the plurality of spatial locations; and
   synchronizing the input signals and output signals to align the input signals and output signals on a time axis, and;
   determining one or more modal frequencies of the structure in motion from frequency response functions (FRFs) calculated for from the input signals and output signals, and;
   animating a selected mode shape by producing a mathematically-modified video that has been filtered at one or more of the modal frequencies, is amplified to enhance a depiction of motion of the structure at one or more selected modal frequencies and is capable of being played back at an adjustable speed suited to a human observer.

2. The method of claim 1, wherein the FRFs are calculated from a selected subset of measurement pixels that have been identified automatically using techniques that detect edges or best features in a reference frame of at least one of the video recordings.

3. The method of claim 2, wherein the mathematically-modified video is enhanced with motion vectors whose size can be adjusted to emphasize the mode shape at the selected subset of measurement pixels.

4. The method of claim 2, wherein the mathematically-modified video is enhanced with a colored mask created from the selected subset of measurement pixels whose position can be scaled to emphasize a motion present in the mode shape.

5. A method of performing modal testing on a structure using video recordings of the structure wherein the video recordings comprise a plurality of image frames, wherein each image frame is divided into a plurality of pixels, the method comprising:
   generating a plurality of excitation events, wherein individually each excitation event produces movement in the structure and collectively the excitation events produce movement at a plurality of spatial locations on the structure;
   measuring an impact on the structure produced by each of the excitation events;
   converting each measured excitation event to an input signal;
   obtaining the video recordings with a plurality of video acquisition devices, wherein the image frames provide output signals representing movement produced in the structure by the excitation events at the plurality of spatial locations; and
   synchronizing the input signals and output signals to align the input signals and output signals on a time axis, and;
   determining one or more modal frequencies of the structure in motion from frequency response functions (FRFs) calculated for from the input signals and output signals, and;
   animating a selected mode shape by producing a mathematically-modified video that has a scaled depiction of motion of the selected mode shape superimposed on a reference selected video frame of the structure and is capable of being played back at an adjustable speed suited to a human observer.

6. The method of claim 5, wherein the FRFs are calculated from a selected subset of the measurement pixels that have been identified automatically using techniques that detect edges or best features in a reference frame of at least one of the video recordings.

7. The method of claim 6, wherein the mathematically-modified video is enhanced with motion vectors whose size can be adjusted to emphasize the mode shape at the selected subset of measurement pixels.

8. The method of claim 6, wherein the mathematically-modified video is enhanced with a colored mask created from the selected subset of measurement pixels whose position can be scaled to emphasize a motion present in the mode shape.

* * * * *